United States Patent [19]

Shin

[11] Patent Number: 4,573,363

[45] Date of Patent: Mar. 4, 1986

[54] VIBRATION ISOLATING COUPLING

[75] Inventor: Warren J. Shin, Kent, Wash.

[73] Assignee: Mannesmann Tally Corporation, Kent, Wash.

[21] Appl. No.: 542,523

[22] Filed: Oct. 17, 1983

[51] Int. Cl.[4] .................................... F16H 37/00

[52] U.S. Cl. .................................... 74/1 SS; 101/93.04; 400/320; 403/224

[58] Field of Search .................... 74/1 SS; 310/15, 17; 366/255, 256, 332; 101/93.04, 93.05; 400/320, 322; 403/220, 224, 291, 337; 464/98, 180

[56] References Cited

U.S. PATENT DOCUMENTS

| | | | |
|---|---|---|---|
| Re. 20,837 | 8/1938 | Armington | 403/224 X |
| 1,780,724 | 11/1930 | Short | 403/224 X |
| 1,920,436 | 8/1933 | Riker | 403/224 X |
| 2,520,442 | 8/1950 | Schwartz | 403/224 X |
| 2,634,069 | 4/1953 | Drake et al. | 403/224 X |
| 2,642,253 | 6/1953 | Markowitz | 403/224 X |
| 2,647,277 | 8/1953 | Christensen | 403/224 X |
| 3,288,541 | 11/1966 | Tracy | 403/220 X |
| 4,317,339 | 3/1982 | Schmidt | 464/98 X |
| 4,461,984 | 7/1984 | Whitaker et al. | 318/687 |

*Primary Examiner*—William E. Tapolcai
*Attorney, Agent, or Firm*—Christensen, O'Connor, Johnson & Kindness

[57] ABSTRACT

A vibration isolating coupling ideally suited for coupling the bobbin (31) of a linear actuator (23) to a flexure supported printer carriage (11) is disclosed. The two main sources of vibration in a system that includes a flexure (13, 15) supported carriage coupled to a linear actuator (23) are low-frequency vibration resulting from the pivot arc motion of the flexures (13, 15), and high frequency vibration resulting from the change in bobbin shape occurs as AC energy is applied to the bobbin (31). The first source of vibration is reduced by configuring the interface plane between the linear actuator and the flexure supported carriage such that contact occurs at spaced apart points located on either side of the flexure movement plane. Preferably, four contact points equally spaced from the flexure motion plane are used. The region between the contact points and the flexure motion plane is cut out so that no contact occurs in and on either side of the flexure motion plane. It is the absence of contact that reduces the first source of vibration. The second source of vibration is reduced by mounting a damping plate (61), preferably comprising a layer of viscoelastic material sandwiched between two layers of steel or some other rigid material, at the interface plane between the linear actuator (23) and the flexure supported carriage (11).

20 Claims, 11 Drawing Figures

VIBRATION ISOLATING COUPLING

TECHNICAL AREA

This invention is related to vibration isolating couplings used to couple drive mechanisms to driven mechanisms; and, more particularly, to vibration isolation couplings used to couple linear actuators to flexure supported carriages.

BACKGROUND OF THE INVENTION

Various types of dot matrix line printers have been proposed and are in use. In general, dot matrix line printers include a print head comprised of a plurality of dot printing mechanisms, each including a dot forming element. The dot forming elements are located along a line that lies orthogonal to the direction of paper movement through the printer. Since paper movement is normally vertical, the dot forming elements usually lie along a horizontal line. Located on the side of the paper remote from the dot forming elements is a platen; and, located between the dot forming elements and the paper is a ribbon. During printing, the dot forming elements are actuated to create one or more dots along the print line defined by the dot forming elements. The paper is incremented forwardly after each dot row is printed. A series of dot rows creates a row of characters.

In general, dot matrix line printers fall into two categories. In the first category are dot matrix line printers wherein only the dot forming elements are shuttled. In the second category, are dot matrix line printers wherein the entire print head, e.g., the actuating mechanism, as well as the dot forming elements, is shuttled. Regardless of type, the portion of the dot printing mechanism to be shuttled is mounted on a carriage and the carriage is moved back and forth (e.g., shuttled) by a shuttling mechanism. The present invention is useful with both categories of dot matrix line printers. More specifically, while the invention was developed for use in connection with a dot matrix line printer wherein the entire print head is shuttled, the invention can also be utilized with dot matrix line printers wherein only the dot forming elements are shuttled.

In order to overcome the speed and other limitations of shuttle mechanisms that include stepper motors or constant speed AC or DC motors, proposals to utilize linear motors to shuttle the print head of line printers (both character and dot matrix line printers) have been proposed. For example, U.S. Pat. No. 3,911,814 discloses a character line printer wherein a hammer bank is supported by flexures. The hammer bank is oscillated between two selected positions by a linear motor. U.S. Pat. No. 4,180,766 discloses the print head of a dot matrix line printer supported by linear bearings and moved along a linear path-of-travel by a linear motor. A commercially available dot matrix line printer including a print head supported by flexures and shuttled by a linear motor is the Model 2608A line printer produced by the Hewlett Packard Company, 1501 Page Mill Road, Palo Alto, Calif. 94304. A further disclosure of a dot matrix line printer including a flexure supported print head oscillated by a linear motor is contained in U.S. patent application Ser. No. 373,802 filed May 3, 1982, by Gordon C. Whitaker and James A. Stafford and assigned to the assignee of the present application, Mannesmann Tally Corporation.

In summary, in the past, proposals have been made to utilize linear motors to shuttle the print heads of line printers. The line printers have included both character and dot matrix line printers and the print heads have been supported by both flexures and other mechanisms, such as linear bearings.

In the past, dot matrix line printers including flexure supported print heads and linear motor print head shuttling mechanisms have only been operable at medium to low speeds (300 lines per minute or less). Higher speed operation has been unsatisfactory due to vibration problems. One vibration problem is associated with the fact that the movable element of a linear motor follows a linear path while a flexure supported print head does not follow a linear path-of-travel. Rather, the path-of-travel of a flexure supported print head is arcuate. The different paths of travel create vibrations at the interface between the print head and the movable element of the linear motor. A second vibration problem is caused by the fact that the movable element of the linear motor changes configuration due to the electromagnetic stress created when the linear motor is energized by a suitable AC power source. In the case where the movable element is coil wound on or in the shape of a bobbin, the bobbin is distorted as the driving electromagnetic field changes. Specifically, the ends of the bobbin diaphragm inwardly and outwardly. Further, the bobbin is alternatively stretched and compressed as the electromagnetic field produced by the current through the bobbin coil changes. These changes in configuration are coupled to and vibrate the print head. Uncontrolled vibration of the print head makes it difficult, if not impossible, to precisely position dots. As a result, printed characters become distorted resulting in an unacceptable printed product. The present invention is directed to substantially reducing, or entirely eliminating, the effect of the just described vibration problems.

SUMMARY OF THE INVENTION

In accordance with this invention, a vibration isolating coupling ideally suited for coupling the movable element, e.g., the bobbin of a linear motor to a flexure supported carriage is provided. The vibration isolating coupling comprises configuring an interface plane lying orthogonal to the direction of linear motor movement such that physical contact at the interface plane only occurs at spaced apart points located on either side of the plane in which the flexure supported carriage moves. Preferably, only four points of contact, equally spaced from the plane in which the flexure supported carriage moves, are present at the interface plane. The region between the contact points and the carriage motion plane is undercut, i.e., removed, so that no contact occurs in and on either side of the carriage motion plane, as the carriage is moved by the linear motor.

In accordance with other aspects of this invention, a damping plate is mounted at the interface plane, between the movable element of the linear motor and carriage.

In accordance with further aspects of this invention, the damping plate comprises a layer of viscoelastic material sandwiched between two thin layers of a rigid material such as steel, aluminum, or the like.

In accordance with yet other aspects of this invention, the housing of the linear actuator is also flexure supported.

In accordance with still other aspects of this invention, the configured interface plane is formed at one end of a yoke whose other end is affixed to one end of the flexure supported carriage.

In accordance with yet still further aspects of this invention, said configured interface end of the yoke includes four arms extending outwardly from a center point, said center point lying both on the axis of movement of the movable element of the linear motor and in the plane of motion of the carriage.

A vibration isolating coupling formed in accordance with the invention overcomes the disadvantages of prior art couplings used to couple the movable element of a linear motor to a flexure supported carriage. The absence of physical contact at and on either side of the plane of movement of the flexure supported carriage reduces the amount of "rocking" contact between the movable element of the linear motor and the carriage. More specifically, because the path-of-travel of the movable element of the linear motor is linear, and the path-of-travel of the carriage is arcuate, the contact force at the interface plane "rocks" back and forth during movement. The majority of the rocking force occurs in the plane of movement of the flexure supported carriage. Eliminating physical contact in this plane reduces the rocking contact force and the vibration created by force. Thus, vibration resulting from the fact that the movable element of the linear motor follows a linear path-of-travel and the flexure supported carriage follows an arcuate path-of-travel is avoided. The damping effect of the damping plate substantially reduces, if not entirely eliminates, the vibration resulting from changes in the shape of the movable element, e.g., the bobbin, of the linear motor that occurs as AC energy applied to the linear motor creates an electromagnetic field that stresses the movable element. Consequently, a vibration isolating coupling formed in accordance with the invention substantially reduces, if not entirely eliminates, the vibration problems described above.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Figure 1:
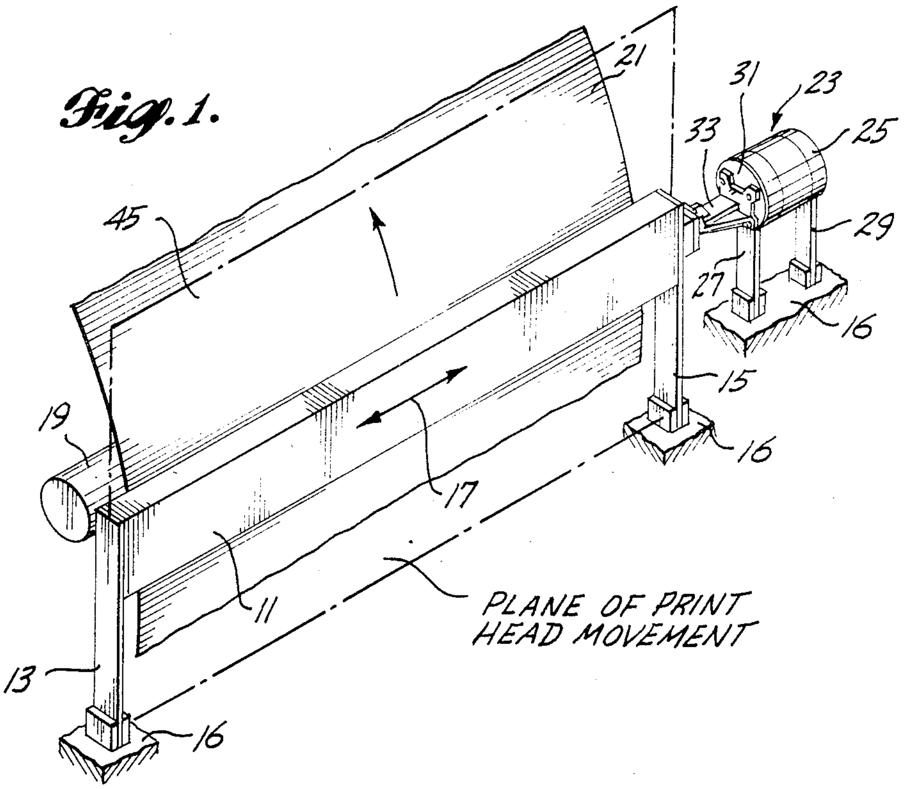
FIG. 1 is a pictorial illustration of a flexure supported carriage coupled to the movable element of a linear motor by a vibration isolating coupling formed in accordance with the invention.

FIG. 1 is a pictorial diagram illustrating the print head 11 of a dot matrix line printer supported by a pair of print head flexures 13 and 15. Since the print head 11 does not form part of this invention, it is illustrated in block form. By way of example, the print head 11 may take the form of the print head described in U.S. Pat. No. 4,351,235 entitled "Dot Printing Mechanism For Dot Matrix Line Printers" assigned to the assignee of the present application, Mannesmann Tally Corporation. Preferably, the print head flexures 13 and 15 are formed of elongate pieces of flat spring steel having one end attached to the frame 16 of the printer. The print head flexures 13 and 15 are aligned with one another and lie in parallel planes separated by the length of the print head 11.

The print head 11 is mounted between the movable ends of the print head flexures 13 and 15 so as to be rectilinearly movable in the direction of an arrow 17. The arrow 17 lies orthogonal to the parallel planes in which the print head flexures 13 and 15 lie. Since the print head 11 is mounted on the end of flexures attached to the frame of the printer, the path-of-travel of the arrow 17 and, thus, print head 11, is not perfectly linear. Rather, the path is slightly arcuate, i.e., curved. As will be better understood from the following discussion, it is this very slight path curvature that creates some of the vibration problems that are reduced and/or eliminated by the present invention.

As will be readily appreciated by those familiar with dot matrix line printers, particularly after reviewing U.S. Pat. No. 4,351,235, referenced above, the print head may include sixty-six separate dot printing mechanisms, each of which is designed to scan or cover two character positions. The total or maximum character line width of such a printer is one hundred thirty-two characters. Since the number of character positions to be scanned (2) is small compared to the number of printing mechanisms (66), obviously, the distance over which the print head is shuttled is small when compared to the length of the print head.

FIG. 1 also shows a platen 19 positioned on the other side of a paper 21 from the print head 11. While not shown in FIG. 1, obviously, a suitable ink source (i.e., a ribbon) is located between the print head and the paper 21, unless the paper is treated to allow image creation without the need for an ink source—thermal sensitive paper, for example. In any event, the print head flexures 13 and 15 are located adjacent the edge of the paper 21.

Located at one end of the print head 11, beyond the nearest print head flexure 15, is a voice coil linear motor 23. The housing 25 of the voice coil linear motor 23 is supported by a pair of motor flexures 27 and 29. One end of the motor flexures 27 and 29 are attached to the frame 16 of the printer. The other ends of the motor flexures 27 and 29 support the housing 25 of the voice coil linear motor. The motor flexures are preferably formed of flat pieces of spring steel lying in parallel planes, which are also parallel to the planes in which the print head flexures 13 and 15 lie.

The voice coil linear motor is positioned such that the rectilinear path-of-travel of the movable element, e.g., the bobbin 31, of the motor 23 is coaxial with the longitudinal axis of the print head 11 and, thus, substantially coaxial with the arcuate path-of-travel of the print head 11. The bobbin 31 of the voice coil linear motor 23 is connected to the adjacent end of the print head 11 by a yoke 33. Thus, as the bobbin 31 of the voice coil linear motor 23 oscillates back and forth, the print head 11 is shuttled back and forth in the direction of the arrow 17 over the required distance—two (2) character positions in the case of the printer briefly described above.

Figure 2:
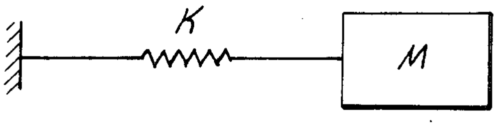
FIG. 2 is an idealized vibration diagram of a system of the type illustrated in FIG. 1.

FIG. 2 is an idealized vibration diagram illustrating a printer shuttling mechanism of the type shown in FIG. 1. In FIG. 2, the print head 11 is represented by a mass, denoted M, attached by a spring, denoted K, to a base. K represents the resonant vibration of the print head flexures 13 and 15; and, the base represents the printer frame 16.

Figure 3:
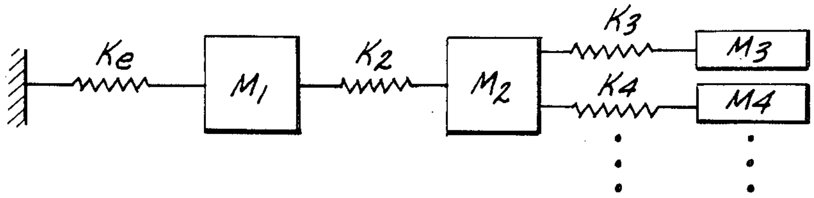
FIG. 3 is a more realistic vibration diagram of a system of the type illustrated in FIG. 1.

As noted above, FIG. 2 is an idealized vibration diagram. However, printers of the type illustrated in FIG. 1 are not ideal. FIG. 3 is a more realistic vibration diagram for a printer shuttling mechanism of the type illustrated in FIG. 1. FIG. 3 includes a block labeled $M_1$ which represents the mass of the printer 11, connected to a base via a spring denoted $K_e$. $K_e$ represents the resonant vibration of flexures 13 and 15. $M_1$ is coupled by a spring denoted $K_2$ to a block labeled $M_2$. $M_2$ represents the yoke mass and $K_2$ represents the resonant vibration of the yoke. $M_2$ in turn, is connected by springs denoted $K_3$, $K_4$ . . . to blocks denoted $M_3$, $M_4$ . . . $M_3$, $M_4$ . . . represent parts of the mass of the movable element of the linear actuator and $K_3$, $K_4$ . . . represent the resonant vibrations thereof. When the movable element is a bobbin energized by AC, $M_3$, $M_4$ . . . and $K_3$, $K_4$ . . . represent such things as: the bobbin ends diaphragming (e.g., vibrating) inwardly and outwardly; the bobbin cylinder vibrating, e.g., expanding and contracting; etc.

Resonant vibration, $K_2$, of the yoke occurs because the force attaching the yoke 33 to the bobbin 31 does not remain constant in the plane of print head motion 45 (FIG. 1) as the print head 11 moves back and forth. That is, as discussed above, the print head 11 moves along a slightly arcuate path-of-travel. Contrariwise, the bobbin moves along a linear path-of-travel. As a result, the force at the interface plane between the print head and the bobbin varies as the print head is moved. More specifically, the force variation in the plane of print head movement rocks back and forth. If the plane of print head movement is vertical, at one end of the path-of-travel of the print head the force at the top of the interface is greater than the force at the bottom. At the other end of the path-of-travel, the force relationship is reversed, i.e., the force at the top of the interface is less than at the bottom. It is this "rocking" force action that causes the yoke and, thus, the print head to vibrate in the absence of the invention. As also discussed above, bobbin vibration results from the application of AC energy to the bobbin coil, which also causes the print head to vibrate in the absence of the invention. The present invention is directed to substantially reducing or entirely eliminating both yoke vibration and the effect of bobbin of vibration on the print head 11.

Figure 4:
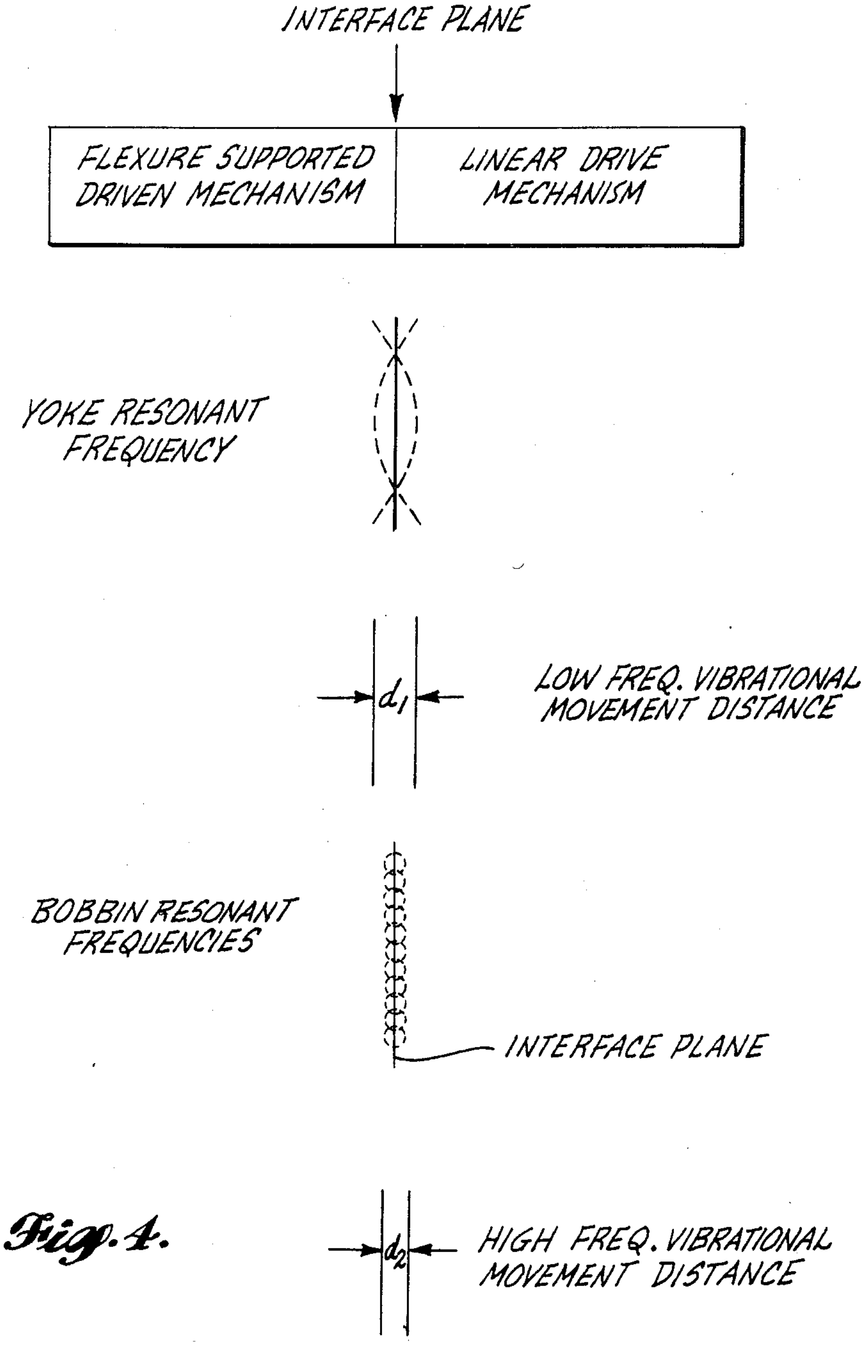
FIG. 4 is a pictorial diagram illustrating the vibration forces that occur at a flat interface plane between a flexure supported carriage and a linear drive mechanism.

FIG. 4 illustrates the vibration that occurs at a flat interface plane located between a linear drive mechanism, such as the linear motor 23, and a flexure supported driven mechanism, such as the print head 11. Because the linear drive mechanism produces a drive force along a linear axis and the flexure supported driven mechanism moves along an arcuate axis, as discussed above, equal forces are not applied across the interface plane, except at the center point of the path-of-travel. As noted above, at one extreme of the path-of-travel of the flexure supported linear mechanism, the force at the top of the interface plane is greater than the force at the bottom. At the other extreme of the path-of-travel of the flexure supported driven mechanism, the opposite effect occurs, i.e., the force at the top of the interface plane is less than the force at the bottom of the interface plane. This rocking motion force change creates a vibration at the yoke resonant frequency, which is illustrated in the second line of FIG. 4. The bobbin configuration change vibration is illustrated in the fourth line of FIG. 4. As shown, the bobbin induced vibration occurs at frequencies that are significantly higher than the yoke vibration frequency. In one actual embodiment of the invention, the yoke vibration frequency was between 220 Hz and 300 Hz, while the bobbin induced vibrations occurred at 1.8 KHz, 2.5 KHz and 3.3 KHz. FIG. 4 also illustrates that the magnitude of the yoke vibration is significantly greater than the magnitude of the bobbin induced vibrations. Consequently, the yoke induced vibration presents a greater problem than does the bobbin induced vibration. In fact, if the magnitude of the bobbin induced vibration is low enough, it can be ignored in many devices, i.e., printers. As discussed next, embodiments of a vibration isolating coupling formed in accordance with the invention reduce or entirely eliminate yoke vibration. This result is achieved by minimizing physical contact at the interface plane between the yoke and the bobbin. Other embodiments of vibration isolating couplings formed in accordance with the invention also reduce the effect of bobbin vibration. This effect is achieved by mounting a damping plate at the interface plane.

Figure 5:
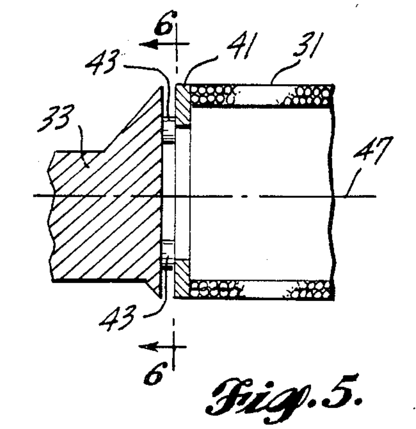
FIG. 5 is a cross-sectional schematic view of one embodiment of a vibration isolating coupling formed in accordance with the invention.
Figure 6:
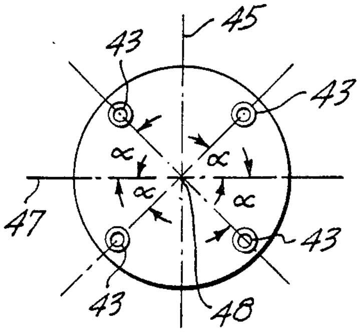
FIG. 6 is a cross-sectional view along line 6—6 of FIG. 5.

FIG. 5 illustrates one embodiment of a vibration isolating coupling formed in accordance with the invention. As shown in FIG. 5, a coupling ring 41 is mounted on the end of the bobbin 31 of the linear motor. As shown in FIG. 6, the facing end of the yoke 33 is configured to include a plurality of cylindrical protrusions 43. The cylindrical protrusions 43 include holes positioned to be aligned with holes formed in the coupling ring 41. Bolts (not shown) attach the yoke 33 to the bobbin 31 via the holes in the cylindrical protrusions 43 and the holes in the ring 41. As a result, the only points of physical contact at the interface plane between the yoke 33 and the bobbin 31 are at the tips of the cylindrical protrusions 43.

As illustrated in FIG. 6, the cylindrical protrusions 43 lie on either side of the plane 45 in which the print head 11 is moved. If the print head 11 moves in a vertical plane, as illustrated in FIG. 1, the plane of movement 45 is vertical. FIG. 6 also illustrates the plane of movement 45 being crossed by a bisecting plane 47. In the case of a vertical plane of movement 45, the bisecting plane 47 is horizontal. In any event, the line 48 defined by the junction between the plane of movement 45 and the bisecting plane 47 lies along the axis of movement of the bobbin 31.

FIG. 6 also illustrates that the preferred number of cylindrical protrusions 43 is four and that one cylindrical protrusion lies in each of the four quadrants defined by the plane of movement 45 and the bisecting plane 47. Further, the cylindrical protrusions 43 lie along diagonal lines 49 that bisect the quandrants. Further, the cylindrical protrusions lie equal distances from the line 48 defined by the junction between the plane of movement 45 and the bisecting plane 47.

It is pointed out that FIGS. 5 and 6 illustrate the minimum acceptable number of cylindrical protrusions and their most preferred location. While more cylindrical protrusions and connecting points can be used, each protrusion and connecting bolt increases the weight of the mechanism being oscillated, and, thus, the energy required to actuate the linear motor. If more than four cylindrical protrusions are desired or required for strength or other reasons, the preferred positions for the next pair is on opposite sides of the plane of movement, along the bisecting plane 47. The only limitation on the location of the cylindrical protrusions is that they should not be located on, or immediately adjacent to, the plane of movement 45. This limitation must be met so that a space exits between the coupling ring 41 and the yoke 33 in the plane of movement 45 and on either side thereof. Because a space is present in this region, contact between the upper and lower edges of the ring 41 and the yoke 33 in this region is avoided. As a result, the magnitude of the vibrations created by the previously described rocking force occurring in the plane of movement is substantially reduced or eliminated. Since yoke vibration is reduced or eliminated, associated print head vibration is reduced or eliminated.

Figure 7:
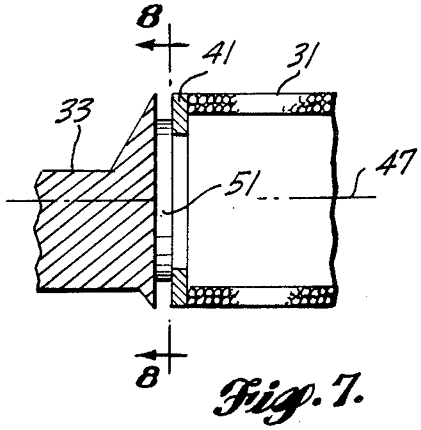
FIG. 7 is a cross-sectional schematic view of an alternative embodiment of a vibration isolating coupling formed in accordance with the invention.
Figure 8:
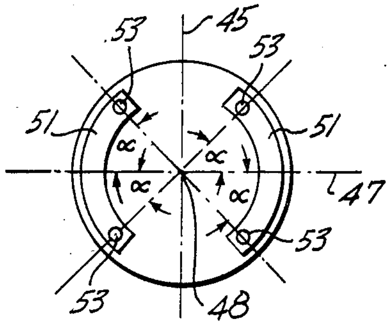
FIG. 8 is a cross-sectional view along line 8—8 of FIG. 7.

FIGS. 7 and 8 illustrate an alternative embodiment of the invention that includes a pair of arcuate protrusions 51 formed on the surface of the yoke 33 facing the bobbin 31. As shown in FIG. 8, the arcuate protrusions 51 are located on opposite sides of the plane 45 in which the print head 11 moves. Further, the arcuate protrusions have a radius of curvature centered at the line 48 between the plane of movement 45 and the bisecting plane 47. The length of the radius of curvature is the same as the radius of curvature of the ring 41. Thus, the tips of the protrusion can be juxtaposed against the adjacent surface of the ring. As a result, no physical contact occurs between the ring 41 and the yoke 33 along and adjacent to the plane of print head movement 45. Thus, vibration resulting from the rocking forces occuring along the print head movement plane 45 as the bobbin 31 moves the print head back and forth are not transferred to the print head.

As with the embodiment of the invention illustrated in FIGS. 5 and 6, the embodiment of the invention illustrated in FIGS. 7 and 8 includes four attachment holes located along diagonals that bisect the plane of print head movement 45 and the bisecting plane 47. That is, the angle between either the plane of print head movement 45 or the bisecting plane 47, and the diagonal, is equal to 45°. The attachment holes pass through the arcuate protrusions 51, near the ends thereof. While four bolt attachment holes located in the positions illustrated and just described are preferred, additional attachment holes may be formed in the protrusions 51, if desired.

Figure 9:
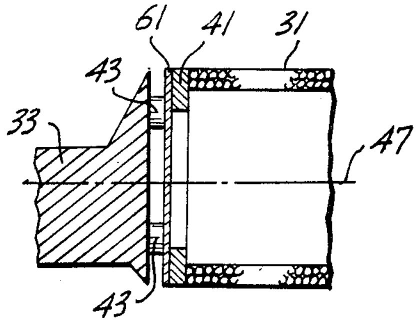
FIG. 9 is a cross-sectional schematic view of a further alternative embodiment of a vibration isolating coupling formed in accordance with the invention.
Figure 10:
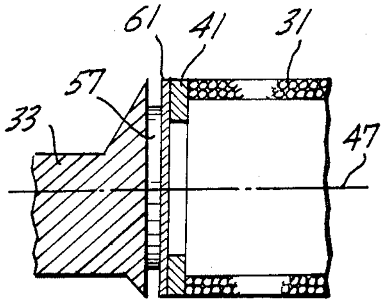
FIG. 10 is a cross-sectional schematic view of a still further embodiment of a vibration isolating coupling formed in accordance with the invention; and, FIG. 11 is an exploded view of an actual embodiment of a vibration isolating coupling formed in accordance with the invention.

As will be appreciated from the foregoing description, the embodiments of the invention illustrated in FIGS. 5 through 8 are directed to reducing or eliminating the effect of vibration caused by the bobbin 31 following a linear path-of-travel and the print head following an arcuate path-of-travel, which difference creates a rocking force action at the interfaced plane between the yoke 33 and the bobbin 31. The reduction in vibration is achieved by creating an open space and, thus, no contact along the plane of print head movement 45 and on either side thereof. While it may reduce some of the vibration created by bobbin distortion, in general, the coupling mechanisms illustrated in FIGS. 5 through 8 are not designed to substantially reduce such vibration. Rather, in accordance with the invention, the embodiments of the invention illustrated in FIGS. 5 through 8 are modified to accomplish this result, i.e., significantly reducing the magnitude of the vibrations created by bobbin distortion. The modifications are illustrated in FIGS. 9 and 10. More specifically, FIG. 9 illustrates a modified version of the embodiment of the invention illustrated in FIGS. 5 and 6 directed to eliminating or reducing the magnitude of the vibrations created by bobbin distortion; and, FIG. 10 illustrates a modified version of the embodiment of the invention illustrated in FIGS. 7 and 8 directed to eliminating or reducing the magnitude of the vibrations created by bobbin distortion.

As illustrated in FIGS. 9 and 10, in accordance with the invention, vibration of the print head 11 due to bobbin distortion is eliminated or substantially reduced by mounting a damping plate 61 between the ends of the cylindrical or arcuate projections, formed in the facing surface of the yoke 33, and the ring 41 mounted on the end of the bobbin 31. Preferably, the damping plate is formed of a layer of viscoelastic material mounted between a pair of rigid, thin plates. The rigid, thin plates may be formed of aluminum steel or some other suitably rigid material. Damping plates suitable for use in embodiments of the invention can be formed from commercially available sounddamped metal-plastic-metal laminated panels. One such panel formed of a viscoelastic thermal plastic interlayer mounted between layers of galvanized cold rolled steel is sold by Antiphon Inc., 290 New Churchmans Road, New Castle, Del. 19720 under the product identifier Antiphon MPM-HT50.

Figure 11:
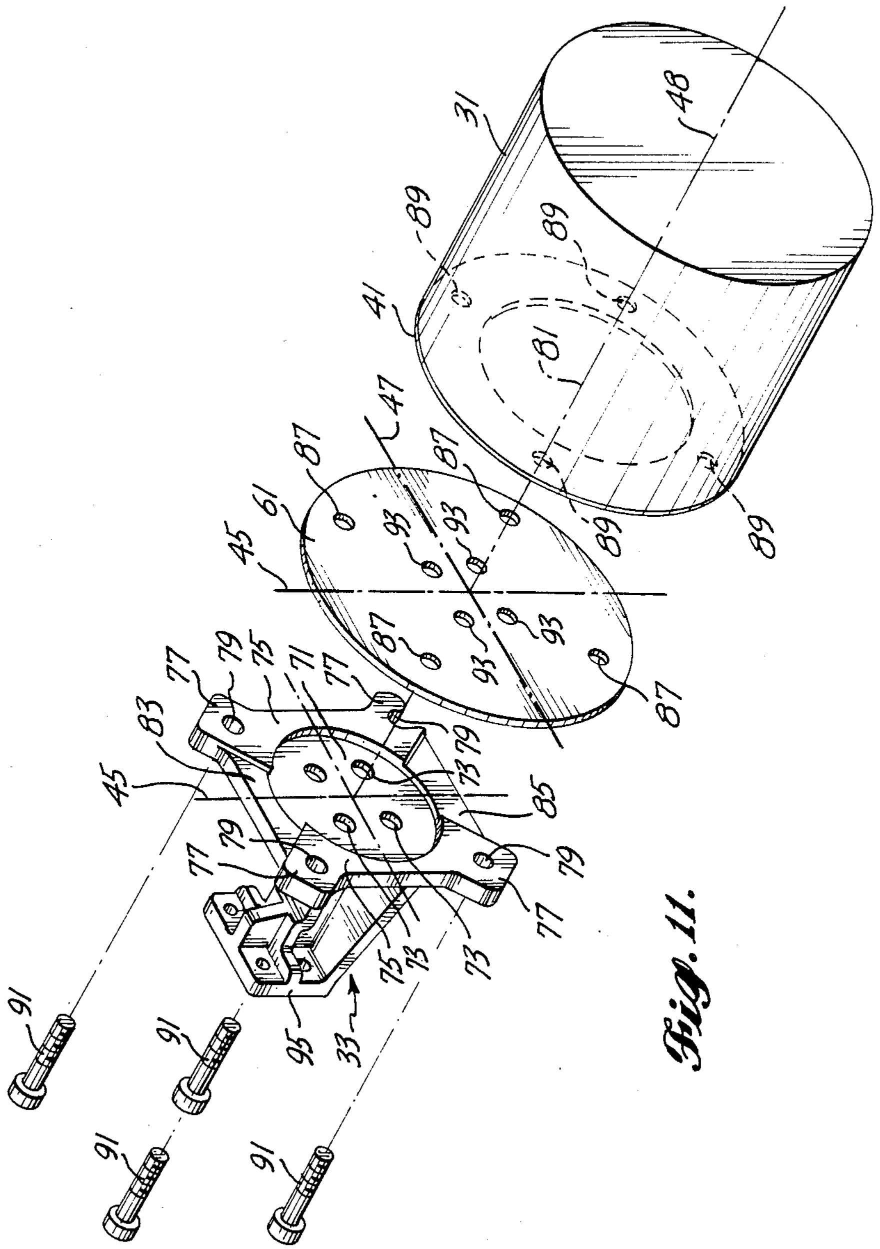

FIG. 11 illustrates an actual embodiment of a coupler formed in accordance with the invention for attaching a bobbin 31 to a print head via a yoke 33. As discussed above, the coupler is formed by the configuration of the interface between the yoke 33 and the bobbin 31.

As with the exemplary embodiments of the invention described above, an attachment ring 41 is mounted on the facing end of the bobbin 31 illustrated in FIG. 11. The center of the surface of the yoke 33 facing the bobbin 31 includes a cylindrical depression 71. Located at the "bottom" of the cylindrical depression 71 are a plurality of air holes 73. Located on opposite sides of the plane of print head movement 45 are protrusions 75. The protrusions 75 partially define the center cylindrical depression 71 and, thus, are somewhat arcuately shaped. The ends of the protrusions 75 include outwardly extending arms 77. Formed in the outer ends of the outwardly extending arms 77 are attachment holes 79. The arms 77 are positioned such that the attachment holes 79 lie along the diagonals that bisect the quandrants defined by the plane of print head movement 45 and the bisecting plane 47, previously described with respect to FIGS. 6 and 8. The region 83 lying between the opposed arms 77 located on one end of the protrusions 75 is undercut, as is the region 85 lying between the opposed arms 77 located on the other ends of the protrusions.

Located between the yoke 33 and the ring 41 is the previously described damping plate 61. The damping plate 61 includes a plurality of peripheral holes 87 positioned so as to be alignable with the holes 79 in the ends of the arms 77. The holes in turn are alignable with holes 89 in the ring 41 mounted on the end of the bobbin 31. Bolts 91 are provided to attach the yoke 33 to the bobbin 31 via the holes 79, 87 and 89. Finally, holes 93 are formed in the central area of the damper plate 61 to provide air flow into the interior of the bobbin 31 to prevent overheating of the linear motor. Located on the side of the yoke 33 remote from the side facing the bobbin 31 is an integral flange 95 that includes holes used to attach the yoke 33 to the print head 11.

As will be readily appreciated from the foregoing description, the invention provides a coupling for connecting a linear motor to a carriage unusable in apparatus such as line printers, wherein the carriage moves along an arcuate axis such that rocking forces occur at the interface plane between the carriage and the linear motor. The coupling is formed by configuring the interfaced plane such that the rocking forces create little or no vibration. While, preferably, the interfaced plane is formed in a yoke used to attach the linear motor to the carriage, the interfaced plane could be formed in the carriage per se, or formed in the attachment end of the movable element (e.g., the bobbin) of the linear motor, if desired. Regardless of where located, the interface configuration must be such that no physical contact occurs along the rocking motion plane and on either side thereof. In this way, the rocking forces create little or no vibration. As noted above, preferably, four attachment points located on opposite sides of the rocking motion plane are used, even though additional attachment points, also located on opposite sides of the rocking motion plane, can be provided, if desired. High frequency vibrations, such as those resulting from the bobbin distortion that occurs when a linear motor is energized, are substantially reduced by mounting a damping plate (preferably formed of a layer of viscoelastic material sandwiched between two rigid layers), between the movable element of the linear motor and the carriage.

While preferred embodiments of the invention have been illustrated and described, it will be appreciate that various changes can be made therein without departing from the spirit and scope of the invention. Consequently, the invention can be practiced otherwise than as specifically described herein.

The embodiments of the invention in which an exclusive property or privilege is claimed are defined as follows:

1. In a system wherein the movable element of a linear actuator is coupled to a carriage supported by flexures for shuttling the carriage back and forth in a plane of movement, said plane of movement defined by the flexures that support the carriage, the improvement comprising:

a vibration isolating coupling for coupling said movable element of said linear actuator to said carriage at an interface plane, said vibration isolating coupling comprising a plurality of protrusions whose outer ends define said interface plane, said plurality of protrusions lying on opposite sides of said plane of movement; and, attachment means for joining said carriage to said movable element of said linear actuator at said interface plane via said protrusions such that the only areas of physical contact between said movable element of said linear actuator and said carriage occur at the ends of said protrusions that define said interface plane.

2. The improvement claimed in claim 1, including a yoke mounted between said flexure supported carriage and said linear actuator, said protrusions and, thus, said interface plane, being located at one end of said yoke.

3. The improvement claimed in claim 1, wherein said plurality of protrusions comprises four cylindrical protrusions, two located on each side of said plane of movement, each of said cylindrical protrusions including a hole via which said attachment means attaches said carriage to said movable element of said linear actuator.

4. The improvement claimed in claim 3, including a yoke mounted between said flexure supported carriage and said linear actuator, said cylindrical protrusions and, thus, said interface plane, being located at one end of said yoke.

5. The improvement claimed in claim 3, including a damper plate mounted between the tips of said cylindrical protrusions and the element to which said cylindrical protrusions are attached.

6. The improvement claimed in claim 5, including a yoke mounted between said flexure supported carriage and said linear actuator, said cylindrical protrusions and, thus, said interface plane, being located at one end of said yoke.

7. The improvement claimed in claim 5, wherein said damper plate comprises a sandwich formed of a layer of viscoelastic material mounted between two thin rigid layers.

8. The improvement claimed in claim 7, including a yoke mounted between said flexure supported carriage and said linear actuator, said cylindrical protrusions and, thus, said interface plane, being located at one end of said yoke.

9. The improvement claimed in claim 1, wherein said plurality of protrusions comprise two arcuate protrusions, one located on each side of said plane of movement and wherein said arcuate protrusions including holes located near the outer ends thereof via which said attachment means attaches said carriage to said movable element of said linear actuator.

10. The improvement claimed in claim 9, including a yoke mounted between said flexure supported carriage and said linear actuator, said arcuate protrusions and, thus, said interface plane, being located at one end of said yoke.

11. The improvement claimed in claim 9, including a damper plate mounted between the tips of said arcuate protrusions and the element to which said arcuate protrusions are attached.

12. The improvement claimed in claim 11, including a yoke mounted between said flexure supported carriage and said linear actuator, said arcuate protrusions and, thus, said interface plane, being located at one end of said yoke.

13. The improvement claimed in claim 11, wherein said damper plate comprises a sandwich formed of a layer of viscoelastic material mounted between two thin rigid layers.

14. The improvement claimed in claim 13, including a yoke mounted between said flexure supported carriage and said linear actuator, said arcuate protrusions and, thus, said interface plane, being located at one end of said yoke.

15. The improvement claimed in claim 9, wherein said arcuate protrusions include outwardly extending arms located at either end thereof and wherein said holes are formed in the ends of said outwardly extending arms.

16. The improvement claimed in claim 15, including a yoke mounted between said flexure supported carriage and said linear actuator, said arcuate protrusions and, thus, said interface plane, being located at one end of said yoke.

17. The improvement claimed in claim 15, including a damper plate mounted between the tips of said arcuate protrusions and the element to which said arcuate protrusions are attached.

18. The improvement claimed in claim 17, including a yoke mounted between said flexure supported carriage and said linear actuator, said arcuate protrusions and, thus, said interface plane, being located at one end of said yoke.

19. The improvement claimed in claim 17, wherein said damper plate comprises a sandwich formed of a layer of viscoelastic material mounted between two thin rigid layers.

20. The improvement claimed in claim 19, including a yoke mounted between said flexure supported carriage and said linear actuator, said arcuate protrusions and, thus, said interface plane, being located at one end of said yoke.

* * * * *